(12) United States Patent
Stevenson et al.

(10) Patent No.: US 8,544,633 B2
(45) Date of Patent: Oct. 1, 2013

(54) SEGMENTED SOLID FEED PUMP

(75) Inventors: John S. Stevenson, Anaheim, CA (US); Derek L. Aldred, Granada Hills, CA (US); Jeffery A. Rader, Burbank, CA (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 13/052,000

(22) Filed: Mar. 18, 2011

(65) Prior Publication Data

US 2012/0234652 A1 Sep. 20, 2012

(51) Int. Cl.
*B65G 17/36* (2006.01)

(52) U.S. Cl.
USPC .............................. 198/708; 198/707; 198/704

(58) Field of Classification Search
USPC ................. 198/701, 703, 704, 707, 708, 711, 198/712
See application file for complete search history.

(56) References Cited

U.S. PATENT DOCUMENTS

| | | | |
|---|---|---|---|
| 2,007,874 A | 7/1935 | Redler | |
| 2,156,878 A | 5/1939 | De Los Sinden | |
| 3,958,847 A * | 5/1976 | Cain et al. | 384/504 |
| 4,042,103 A * | 8/1977 | Santen | 198/704 |
| 4,171,739 A * | 10/1979 | Yamato | 198/704 |
| 4,503,971 A * | 3/1985 | Lachmann | 198/833 |
| 4,988,239 A | 1/1991 | Firth | |
| 5,051,041 A | 9/1991 | Firth | |
| 5,402,876 A | 4/1995 | Hay | |
| 5,485,909 A | 1/1996 | Hay | |
| 5,497,873 A | 3/1996 | Hay | |
| 5,551,553 A | 9/1996 | Hay | |
| 5,833,047 A * | 11/1998 | Howe | 198/708 |
| 6,213,289 B1 | 4/2001 | Hay et al. | |
| 7,387,197 B2 | 6/2008 | Sprouse et al. | |
| 2004/0026215 A1* | 2/2004 | Snowball | 198/708 |

FOREIGN PATENT DOCUMENTS

| | | |
|---|---|---|
| DE | 1002243 | 2/1957 |
| GB | 611784 | 11/1948 |
| GB | 816128 | 7/1959 |
| GB | 1057467 | 2/1967 |

OTHER PUBLICATIONS

European Search Report for EP12159364 dated Jul. 23, 2012.

* cited by examiner

*Primary Examiner* — James R Bidwell
(74) *Attorney, Agent, or Firm* — Fletcher Yoder, P.C.

(57) ABSTRACT

A system is provided with a segmented solid feed pump having a plurality of pump segments disposed along a closed-loop path. The plurality of pump segments are coupled together in series along the closed-loop path, and the plurality of pump segments move along the closed-loop path. Furthermore, each pump segment includes a holding receptacle.

25 Claims, 12 Drawing Sheets

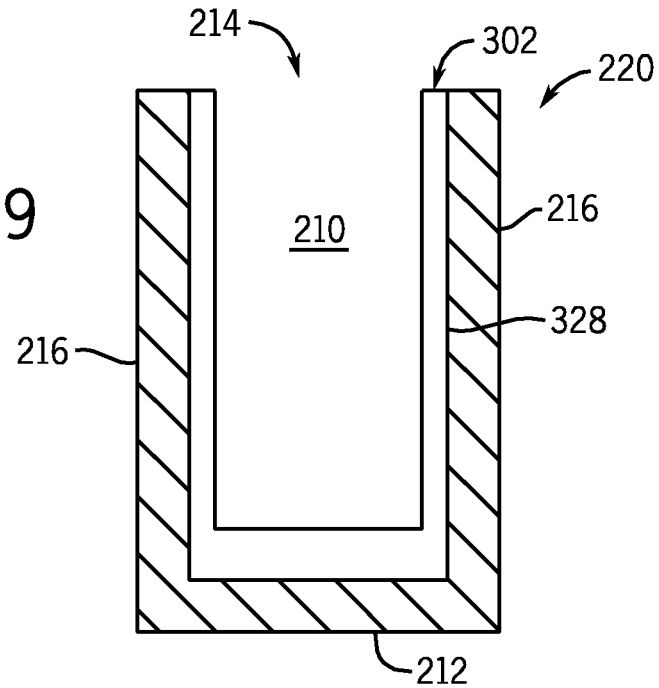
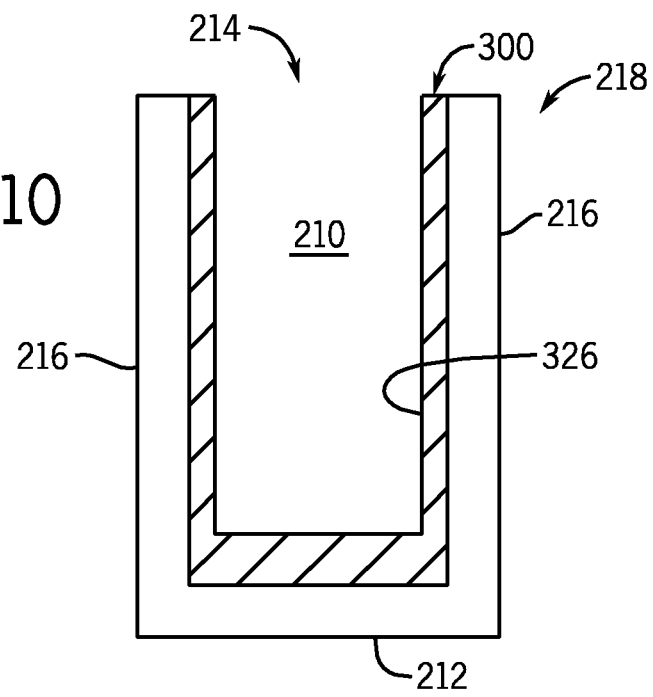

SEGMENTED SOLID FEED PUMP

BACKGROUND OF THE INVENTION

The subject matter disclosed herein relates to a pump for a solid, such as particulate matter. More particularly, the pump may be used for delivering solid feedstock (e.g., coal) to a gasifier in an integrated gasification combined cycle (IGCC) power plant.

A typical pump designed for solids, such as particulate matter, has a single continuous channel. For example, the pump may rotate a disk within a circular housing, thereby driving the particulate matter along a circular path from an inlet to an outlet. Unfortunately, the outlet is abruptly angled relative to the circular path, thereby causing potential clogging, high stresses, and high power requirements in the pump. Moreover, the pump is limited to a circular path.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a segmented solid feed pump having a closed-loop path and a plurality of pump segments coupled together in series along the closed-loop path. In addition, each pump segment has a holding receptacle, and the plurality of pump segments move along the closed-loop path.

In a second embodiment, a system includes a segmented solid feed pump having a closed-loop path and a plurality of pump segments coupled together in series along the closed-loop path, wherein the plurality of pump segments move along the closed-loop path. In addition, the segmented solid feed pump includes a first material transport section disposed in a first fixed position along a first portion of the closed-loop path. The first material transport section includes a first inlet duct, a first outlet duct, and a first guide extending between the first inlet duct and the first outlet duct.

In a third embodiment, a system includes a segmented solid feed pump having a closed-loop path and a plurality of pump segments coupled together in series along the closed-loop path, wherein the plurality of pump segments move along the closed-loop path. In addition, each pump segment has opposite side walls, an open top, and a movable bottom wall.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 is a schematic front end cross-sectional view of an embodiment of the pump segment as illustrated in FIG. 7, taken along line 9-9;

FIG. 10 is a schematic rear end cross-sectional view of an embodiment of the pump segment as illustrated in FIG. 7, taken along line 10-10;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
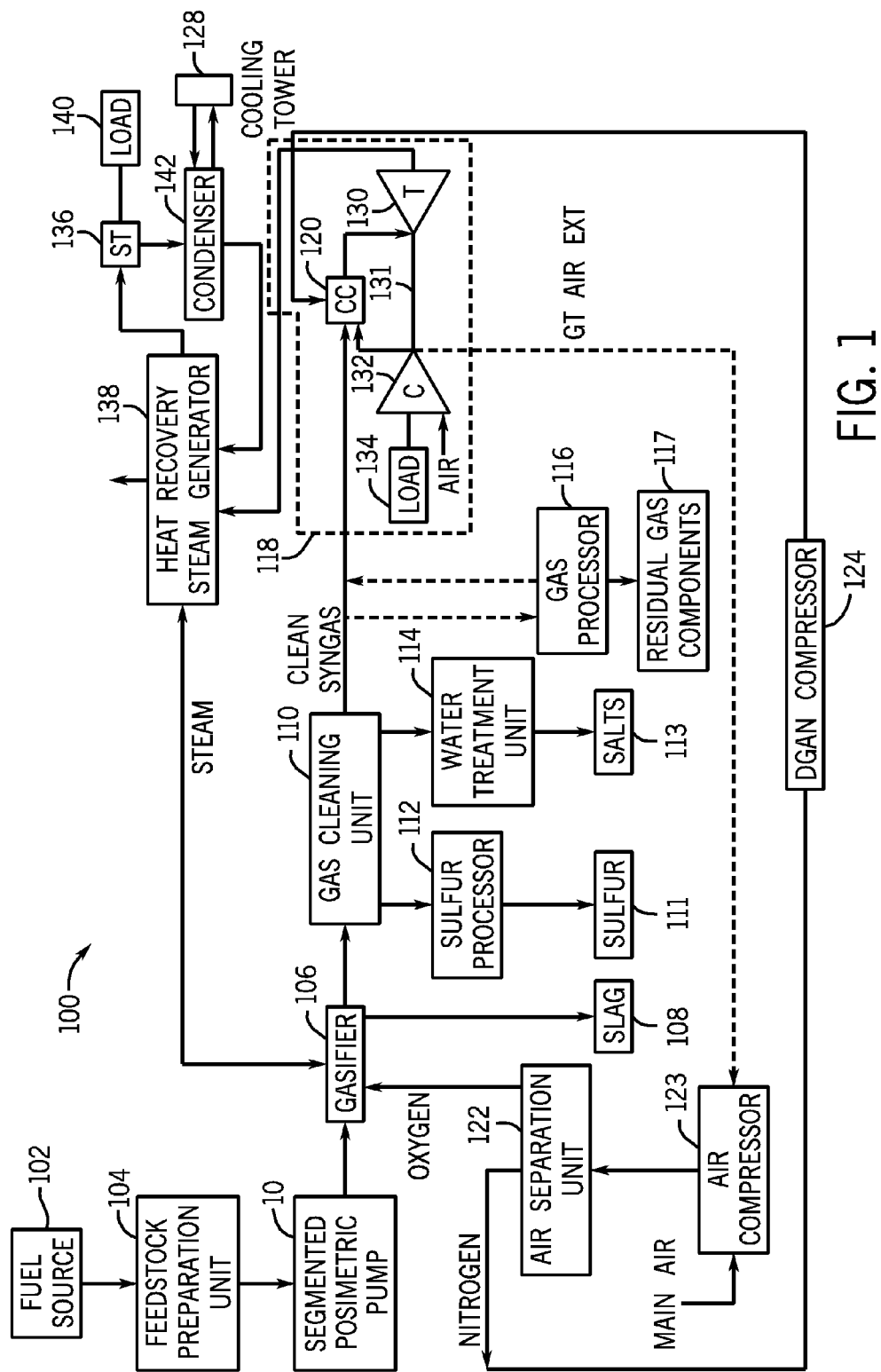
FIG. 1 a schematic block diagram of an embodiment of an integrated gasification combined cycle (IGCC) power plant utilizing a segmented solid feed pump.

FIG. 1 is a diagram of an embodiment of an integrated gasification combined cycle (IGCC) system 100 utilizing one or more segmented solid feed pumps 10. For example, in certain embodiments, the disclosed solid feed pumps 10 may be posimetric pumps. The term "posimetric" may be defined as capable of metering (e.g., measuring an amount of) and positively displacing (e.g., trapping and forcing displacement of) a substance being delivered by the pump 10. As discussed in detail below, embodiments of the segmented solid feed pump 10 may include a plurality of pump segments interlinked together along a closed-loop pump path. Each pump segment is able to meter and positively displace a defined volume of a substance, such as a solid fuel feedstock. The pump path may be oriented in a vertical arrangement, a horizontal arrangement, or any arrangement between vertical and horizontal arrangements. Furthermore, the pump path may have a circular shape or a non-circular shape. For example, the pump path may have a racetrack shape with opposite parallel portions between opposite curved portions. By further example, the pump path may have an oval shape. Each pump segment may have a receptacle, such as a cup-shaped receptacle, configured to hold a solid substance. Each pump segment also may include opposite ends that overlap with adjacent pump segments, thereby blocking leakage of the substance being pumped. Although the segmented solid feed pump 10 is discussed with reference to the IGCC system 100 in FIG. 1, the disclosed embodiments of the segmented solid feed pump 10 may be used in any suitable application.

The IGCC system 100 produces and burns a synthetic gas, i.e., syngas, to generate electricity. Elements of the IGCC system 100 may include a solid fuel source 102 that may be utilized as a source of energy for the IGCC. The solid fuel source 102 may include coal, petroleum coke, biomass, wood-based materials, agricultural wastes, or other carbon containing solids items. The solid fuel source 102 may be passed to a feedstock preparation unit 104. The feedstock preparation unit 104 may, for example, resize or reshaped the fuel source 102 by chopping, milling, shredding, pulverizing, briquetting, or pelletizing the solid fuel source 102 to generate feedstock. The feedstock also may be dried or at least partially dried. Alternatively, the moisture or liquid content of the feedstock may be increased to the extent that the moisture or liquid content does not preclude the ability of the feedstock to enter, lockup, and exit the pump.

In the illustrated embodiment, the segmented solid feed pump 10 delivers the feedstock from the feedstock preparation unit 104 to a gasifier 106. As discussed in detail below, the segmented solid feed pump 10 is configured to meter and pressurize the feedstock received by the feedstock preparation unit 104 from the solid fuel source 102. Alternatively, after metering or pressurization, the feedstock from feedstock preparation unit 104 may be combined with a carrier gas, such as nitrogen from the DGAN compressor 124, as described below, to facilitate transport of the feedstock to the gasifier 106. In other embodiments, compatible gases from other sources, such as $CO_2$ from gas cleaning unit 110, may be used to facilitate the transport of the solid feedstock to gasifier 106.

The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized in the system 100. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon dioxide and release energy, which drives a second reaction that converts further feedstock to hydrogen and additional carbon monoxide.

In this way, a resultant gas is manufactured by the gasifier 106. This resultant gas may, for example, include approximately 85% of carbon monoxide and hydrogen in equal proportions, as well as $CO_2$, $H_2O$, $CH_4$, HCl, HF, COS, $NH_3$, HCN, and $H_2S$. This resultant gas may be termed dirty syngas, since it contains, for example, $H_2S$. The gasifier 106 may also generate solid byproducts, such as slag 108, which may be a wet ash material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, sulfur processor 112 also may include conversion of the sulfur entering processor 112 into a sulfur containing byproduct, such as elemental sulfur or sulfuric acid. Moreover, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the clean syngas such as, ammonia and methane, as well as methanol or any residual chemicals, or to react a portion of the clean syngas carbon monoxide with water to produce carbon dioxide and hydrogen. However, removal of residual gas components 117 from the clean syngas or reaction of the clean syngas with water is optional, since the clean syngas may be utilized as a fuel even when containing the residual gas components 117, e.g., tail gas. In certain embodiments, the clean syngas may include approximately 3% CO, approximately 55% $H_2$, and approximately 40% $CO_2$ and is substantially stripped of $H_2S$. This clean syngas may be transmitted to a combustor 120, e.g., a combustion chamber, of a gas turbine engine 118 as combustible fuel. Alternatively, the reaction of CO with water may be carried out in or upstream of gas cleaning unit 110. Further, alternatively, $CO_2$ may be removed from the clean syngas prior to transmission to the gas turbine engine. In other embodiments, a compressor may be used to first compress the syngas to higher pressure before feeding the syngas to combustor 120.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example. In other embodiments, after additional compression (as appropriate), the nitrogen also may be used as a carrier gas to facilitate transport of the solid feedstock to the gasifier 106.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust inlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include a heat recovery steam generator HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
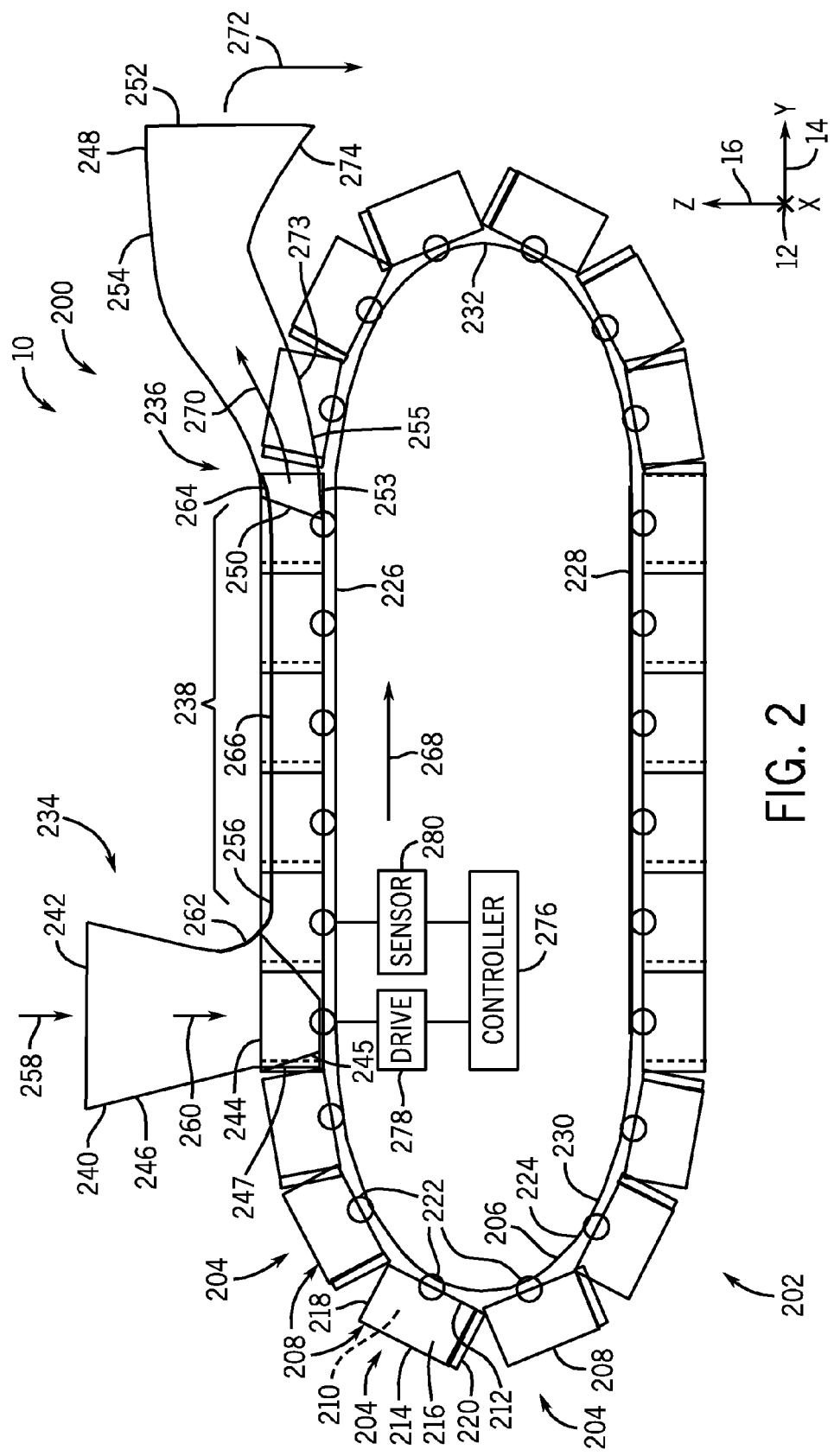
FIG. 2 is a schematic side view of an embodiment of a segmented solid feed pump oriented in a vertical arrangement.

FIG. 2 is a schematic side view of an embodiment of the segmented solid feed pump 10 oriented in a vertical arrangement. As indicated by the legend, cross 12 indicates a horizontal X-axis or direction out of the page, arrow 14 indicates a horizontal Y-axis or direction parallel to the page, and arrow 16 indicates a vertical Z-axis or direction parallel to the page. In the illustrated embodiment, the segmented solid feed pump 10 includes a material transport section 200 disposed along a portion of a segmented pump loop or carriage loop 202. As discussed in detail below, the material transport section 200 is generally fixed in position, while the carriage loop 202 moves relative to the material transport section 200. The loop 202 includes a plurality of pump segments 204 coupled together one after another in series about a closed-loop path 206. Each pump segment 204 includes a carriage 208 having a holding receptacle 210 defined by a bottom wall 212, an open top 214, opposite side walls 216, a front coupling 218, and a rear coupling 220. In the illustrated embodiment, each pump segment 204 orients the open top 214 outwardly away from the closed-loop path 206. As discussed further below, each carriage 208 at least partially mates in an overlapping connection with adjacent carriages 208 on opposite front and rear sides in the transport section 200 of pump 10. For example, each carriage 208 has the front coupling 218 at least partially overlapping with the rear coupling 220 of a frontward carriage 208, while the carriage 208 has the rear coupling 220 at least partially overlapping with the front coupling 218 of a rearward carriage 208 facilitating the temporary joining or engagement of adjacent carriages 208 in transport section 200. In this manner, the carriages 208 are at least partially overlapping with adjacent carriages 208 about at least a portion of the closed-loop path 206. For example, as discussed in detail below, adjacent carriages 208 may at least partially overlap one another between an inlet duct 240 and an outlet duct 248 of the closed-loop path 206, while the adjacent carriages 208 may or may not overlap one another in other portions of the closed-loop path 206. In certain embodiments, the adjacent carriages 208 may interlock with one another along overlapping portions to define a substantially rigid channel between the inlet duct 240 and the outlet duct 248. In addition, each carriage 208 includes one or more track followers or wheels 222.

The illustrated closed-loop path 206 includes a track structure 224 engaged with the track followers or wheels 222 of each carriage 208. For example, embodiments of the track structure 224 may include a chain, a belt, a rail, or any suitable stationary or movable structure. In one embodiment, the track followers or wheels 222 may be rotatable or pivotable linkages fixed to the track structure 224, while the track structure 224 moves along the closed-loop path 206. In another embodiment, the track structure 224 may be fixed along the closed-loop path 206, while the track followers or wheels 222 are driven to move along the closed-loop path 206. In still another embodiment, the track structure 224 may be a gear or belt drive system that may include elements such as guides and tensioners. The closed-loop path 206 may have a variety of shapes, such as a circular shape or a non-circular shape. In the illustrated embodiment, the closed-loop path 206 has a racetrack shape, which includes opposite straight path portions 226 and 228 disposed between opposite curved path portions 230 and 232. For example, the straight path portion 226 may extend along the transport section 200 between the inlet duct 240 and the outlet duct 248, wherein the straight path portion 226 may extend at least proximate to or slightly upstream of the inlet duct 240 and at least proximate to or slightly downstream of the outlet duct 248. In other embodiments, the closed-loop path 206 may be oval or substantially curved. For example, the portion 226 may be a curved path portion extending along the transport section 200 between the inlet duct 240 and the outlet duct 248. Furthermore, the curved path portion may have a substantially constant arc that extends at least proximate to or slightly upstream of the inlet duct 240 and at least proximate to or slightly downstream of the outlet duct 248.

In the illustrated embodiment, the segmented solid feed pump 10 is oriented in a vertical arrangement. In particular, the illustrated closed-loop path 206 may be oriented in a vertical plane relative to the vertical axis 16. In the illustrated vertical orientation of the carriage loop 202, the straight path portion 226 is an upper portion, while the straight path portion 228 is a lower portion vertically offset below the upper portion. Furthermore, the illustrated material transport section 200 is coupled to the upper straight path portion 226. The illustrated straight path portions 226 and 228 are generally parallel with one another, although other embodiments may orient the straight path portions 226 and 228 in a non-parallel arrangement. The opposite curved path portions 230 and 232 have opposite C-shapes, although other curved shapes may be employed in alternative embodiments. In the illustrated embodiment, the open top 214 of each carriage 208 faces upwardly along the upper portion 226, downwardly along the lower portion 228, leftwardly along the left curved path portion 230, and rightwardly along the right curved path portion 232.

The illustrated material transport section 200 includes an inlet or metering zone 234, an outlet or pressurization zone 236, and an intermediate metering and/or lock-up zone 238. In the illustrated embodiment, the inlet or metering zone 234 includes an inlet duct 240 having an inlet 242, an outlet 244, and a closed wall 246 between the inlet and the outlet 244. The closed wall 246 may include an inner wall portion 245 and an outer wall portion 247, wherein the inner wall portion 245 extends into an interior of the carriages 208 while the outer wall portion 247 extends around an exterior of the carriages 208. For example, the inner wall portion 245 may extend to the bottom of the passing carriages 208 at an angle to guide flow of a substance into the carriages 208, while also blocking any back flow of the substance. The outlet or pressurization zone 236 includes an outlet duct 248 having an inlet 250, an outlet 252, and a closed wall 254 between the inlet 250 and the outlet 252. The closed wall 254 may include an inner wall portion 253 and an outer wall portion 255, wherein the inner wall portion 253 extends into an interior of the carriages 208 while the outer wall portion 255 extends around an exterior of the carriages 208. For example, the inner wall portion 253 may extend to the bottom of the passing carriages 208 at an angle to guide flow of a substance out of the carriages 208, e.g., gradually scoop up and deliver the substance through the outlet duct 248. The lock-up zone 238 includes a contoured guide plate or cover 256 extending between the closed wall 246 of the inlet duct 240 and the closed wall 254 of the outlet duct 248. For example, the cover 256 may extend over the open tops 214 of the carriages 208 moving between the outlet 244 of the inlet duct 240 and the inlet 250 of the outlet duct 248. In this manner, the cover 256 completely closes off the holding receptacle 210 of each carriage 208 passing between the inlet duct 240 and the outlet duct 248.

In certain embodiments, the material transport section 200 may be configured to transport, meter, and pressurize the substance (e.g., a solid fuel feedstock) being handled by the segmented solid feed pump 10. For example, the inlet duct 240 of pump 10 may be configured to facilitate the ready or free flow of substance through inlet duct 240 into passing receptacles 210, such that pump 10 will not be starved of the substance. In certain embodiments, the flow of substance through inlet duct 240 may be mechanically assisted, such as by mechanical vibration, where care is taken to ensure the vibration does not interfere with achieving lockup in lockup zone 238. Furthermore, in certain embodiments, the flow of substance through inlet duct 240 may be pneumatically assisted, such as by a pneumatic system, where care is taken to ensure that the substance effectively flows into receptacles 210. Some embodiments also may employ other flow aiding elements to facilitate the flow of substance through the inlet duct 240. In the illustrated embodiment, the substance thus may flow into inlet duct 240 through the inlet 242 in an inlet direction 258, and then through the outlet 244 into a passing carriage 208 in an outlet direction 260. In the illustrated embodiment, the holding receptacle 210 of each carriage 208 has an equal and constant volume for metering purposes. Thus, a volume of pumped substance per unit of time can be easily calculated based on the number of carriages 208 passing by the outlet 244 of the inlet duct 240 per unit of time. Similarly, metering or control of the volume of substance pumped per unit of time may be effected by monitoring and adjusting the speed at which carriages 208 pass inlet 240. In certain embodiments, the speed may be controlled by a drive mechanism, such as a motor with speed control. Thus, the speed control can be used to increase or decrease the flow rate of substance being delivered by the pump 10. In another embodiment, one or more sensors may be disposed at one or more locations to track the number of carriage 208 passing by a portion of the pump 10 per unit of time. For example, the inlet or metering zone 234 may include one or more sensors to track the number of carriages 208 passing by the outlet 244 of the inlet duct 240 per unit of time. By further example, the sensors may be disposed at any location along the loop 202.

As illustrated, the inlet duct 240 delivers the substance to the passing carriages 208 in directions 258 and 260. For example, the inlet directions 258 and 260 may be parallel to the vertical axis 16 and perpendicular to a carriage direction 268 of the passing carriages 208 moving along the upper straight path portion 226. As the substance fills each holding receptacle 210, each carriage 208 moves from the inlet duct 240 toward the cover 256 of the lock-up zone 238. The cover 256 extends over the open top 314 of each carriage 208 between the inlet duct 240 and the outlet duct 248. Furthermore, the cover 256 may be shaped to provide a smooth transition between the outlet 244 of the inlet duct 240 and the cover 256, and between the cover 256 and the inlet 250 of the outlet duct 248, thereby minimizing the effect of the transitions on the movement of substance through solid feed pump 10. For instance, the illustrated cover 256 includes a curved entry section 262, a curved exit section 264, and an intermediate straight section 266 (e.g., parallel in downstream direction) relative to the straight path portion 226. In certain embodiments, the cover 256 may be adjustable to vary a volume between the cover 256 and the passing carriages 208. For example, the cover 256 may be moved toward or partially into the passing carriages 208 to decrease a carrying capacity of each carriage 208, thereby reducing the flow rate of the pump 10. Likewise, the cover 256 may be moved away from the passing carriages 208, while still maintaining a closed volume between the cover 256 and the carriages 208, to increase a carrying capacity of each carriage 208 and, thus, increase the flow rate of the pump 10. As illustrated, the passing carriages 208 transport the substance from the inlet duct 240 in a carriage direction 268 along the intermediate straight section 266 to the outlet duct 248, which then receives the substance through the inlet 250 in an inlet direction 270. The outlet duct 248 then routes the substance through the closed wall 254 and out through the outlet 252 in an outlet direction 272. For example, the outlet duct 248 may direct the substance, such as a solid fuel feedstock, into the gasifier 106 as shown in FIG. 1.

The curved entry section 262, curved exit section 264, and intermediate straight section 266 of the cover 256 are configured to control the flow of substance between the inlet and outlet ducts 240 and 248. The curved entry section 262 is configured to facilitate the flow of substance from inlet duct 240 into the moving carriages 208 in a somewhat converging manner, while the curved exit section 264 is configured to gradually guide the substance from the carriages 208 into the outlet duct 248 in a somewhat diverging manner. In certain embodiments, the inlet duct 240 and entry section 262 are configured to feed the substance into receptacles 210 in a somewhat diverging manner. Furthermore, in certain embodiments, the outlet duct 248 and exit section 264 may be configured to discharge the substance in a somewhat converging manner. In other embodiments, at least one of inlet duct 240 and entry section 262, and outlet duct 248 and exit section 264 are configured to create a flow path that is neither converging nor diverging. In some embodiments, inlet duct 240, entry section 262, outlet duct 248, and exit section 264 may be configured to be any shape that facilitates operation of pump 10 as described herein.

In the illustrated embodiment, the straight section 266 is parallel to the bottom wall 212 of each passing carriage 208 forming a duct of constant cross-sectional area with carriages 208 downstream of inlet 234 and upstream of outlet 236, wherein the bottom wall 212 and side walls 216 are moving and the top wall or cover 256 serves as a stationary guide surface. In certain embodiments, the cover 256 may be disposed directly along the open tops 214 of carriages 208. In certain other embodiments, the cover 256 may extend partially below the open top 214 of each carriage 208. In some embodiments, such as when pump 10 is used with certain compressible solids, the cover 256 may be shaped to somewhat converge relative to the bottom walls 212 of the carriages 208 along at least a portion of intermediate lockup zone 238. Furthermore, some embodiments of the cover 256 may first somewhat converge and then somewhat diverge relative to the bottom walls 212 of the passing carriages 208. In other embodiments, the cover 256 may have any shape that facilitates the operation of pump 10 as provided herein.

Upon reaching the inlet 250 of the outlet duct 248, the substance in each passing carriage 208 is guided into and through the outlet duct 248. For instance, in the illustrated embodiment, the curved exit section 264 of the cover 256 extends at least partially into the inlet 250 of the outlet duct 248. In addition, the inlet 250 of the outlet duct 248 may be disposed directly along the bottom wall 212 of each passing carriage 208. For example, the inlet 250 of the outlet duct 248 may be angled upwardly in a downstream direction along the bottom wall 212 of the passing carriages 208, thereby scooping up or scraping up the substance in each holding receptacle 210 of the passing carriages 208. Furthermore, at least one upstream edge of inlet 250 of outlet duct 248 may be shaped to facilitate the pickup of substance from receptacles 210, including but not limited to incorporating one or more knife-like leading edges.

The outlet duct 248 may have a variety of geometries and orientations to facilitate operation of the pump 10. In the illustrated embodiment, the inlet direction 270 of the substance entering the outlet duct 248 is oriented generally along the horizontal axis 14 and the carriage direction 268. In other words, the inlet direction 270 is not abruptly angled relative to the carriage direction 268 of the passing carriages 208 moving along the upper straight path portion 226. For example, the inlet direction 270 may be at least initially parallel to the horizontal axis 14 and the carriage direction 268, and then the inlet direction 270 may gradually curve upward away from the horizontal axis 14. By further example, an upstream duct portion 273 of the outlet duct 248 may gradually curve by an angle of less than approximately 5, 10, 15, 20, 25, or 30 degrees relative to the horizontal axis 14 and the carriage direction 268. In turn, the outlet duct 248 may change the direction of the substance from the upstream duct portion 273 to a downstream duct portion 274. For example, the downstream duct portion 274 may turn the substance in a downward direction, an upward direction, or a straight horizontal direction. However, the outlet duct 248 may have a variety of orientations and geometries based on implementation-specific design considerations.

In certain embodiments, the orientation and geometry of the outlet duct 248 may be configured to facilitate the feeding of the substance into a downstream system operating at a similar or a much higher pressure, e.g., only metering or both metering and pressurization. For example, in the illustrated embodiment, outlet duct 248 is configured to feed the substance into a downstream system operating at higher pressure by incorporating an upward angle and turn through the outlet duct 248. The upward angle and turn may help provide a back flow resistance that substantially limits or eliminates the permeation or back flow of downstream high pressure fluid through the outlet duct, while still enabling flow of the solid feedstock in the downstream direction. The inlet zone 234 and lock-up zone 238 thus may operate at substantially the same pressure as the supply to pump 10, while feeding substance to a high pressure downstream system. Again, in certain embodiments, the geometry of the outlet duct 248 may be designed for metering only, and thus the outlet duct 248 may be modified to significantly improve flow and reduce pressurization through the outlet duct 248. For instance, in one embodiment, the outlet duct 248 may be oriented parallel to the straight path portion 226 (e.g., horizontal). In another embodiment, the outlet duct 248 may be initially oriented substantially parallel to the straight path portion 226 (e.g., horizontal), and then turn away from the straight path portion 226 (e.g., vertically downward). The outlet duct 248 also may include a valve or pressure control mechanism, such as a flapper, to assist with startup of the pump 10 and/or to maintain a back pressure on the substance being discharged from the pump 10. For example, the pressure control mechanism may help lock up a substance being transported through the pump 10, thereby helping to achieve a desired flow rate through the pump 10.

In the illustrated embodiment, the partial overlapping in the transport section 200 of the pump 10 occurs to the extent that the adjacent carriages 208 may be considered to be fully engaged with one another, thereby forming a progressing rigid channel with fixed cover 256 to transport the substance through the transport section 200 of the pump 10. However, with certain substances, the spacing between the mating surfaces between carriages 208, cover 256, inlet duct 240, and outlet duct 244 may not be sufficiently small to block all leakage of the substance into the casing of the segmented solid feed pump 10. In some embodiments, the casing of pump 10 may include a removable window to facilitate the periodic removal of leaked substance from the casing of pump 10. Furthermore, in some embodiments, the casing of pump 10 may have at least one discharge port to facilitate the removal of the substance from the casing of pump 10. In addition, in some embodiments, the leakage of the substance from transport section 200 into the casing of pump 10 during operation may be controlled by using seals between the mating faces of the carriages 208, cover 256, inlet duct 240, and outlet duct 244. For example, the seals may include, but are not limited to, brush seals, polymeric seals, graphite impregnated fiber or fabric seals, or ceramic seals. The seals may be designed to block leakage of the solid feedstock. However, as discussed below, the seals may or may not block fluid (e.g., gas) leakage between the mating faces of the carriages 208, cover 256, inlet duct 240, and outlet duct 244. In some embodiments, the pump 10 is calibrated or monitored to account for the leakage of substance in determining the net flow of substance through pump 10.

In certain embodiments, the pump 10 includes pressure-tight seals between the mating faces of carriages 208, cover 256, inlet duct 240, and/or outlet duct 244. The pressure-tight seals may be useful in applications having an elevated pressure downstream from the pump 10 (e.g., a higher pressure downstream system) or an elevated pressure upstream from the pump 10 (e.g., a higher pressure upstream system). For example, a pressure rise associated with feeding a substance to an elevated pressure downstream of the pump 10 may be taken across at least a portion of the substance and associated pump 10 components within lockup zone 234. By further example, a pressure drop associated with letting down the pressure of the substance from an elevated pressure upstream of the pump 10 may be taken across at least a portion of the substance contained within lockup zone 234. Additionally, in some embodiments, an inert gas may be injected upstream of the pressure letdown region to control leakage of a high pressure upstream fluid.

In the illustrated embodiment, the inlet duct 240 and the outlet duct 248 may have constant or variable geometries between their respective inlets and outlets. For example, the illustrated inlet duct 240 has a somewhat converging geometry from the inlet 242 to the outlet 244. In contrast, the outlet duct 248 has a somewhat diverging geometry from the inlet 250 to the outlet 252. The somewhat converging geometry from the inlet duct 240 may be configured to facilitate guiding the substance into the passing carriages 208. The somewhat diverging geometry of the outlet duct 248 may be configured to control the pressurization, power requirements, and flow of the substance out of the pump 10. However, the outlet duct 248 may have a variety of converging or diverging geometries to control the flow and pressurization of the substance passing through the outlet duct 248.

The illustrated segmented solid feed pump 10 also may include a controller 276, one or more drives 278 coupled to the controller 276, and one or more sensors 280 coupled to the controller 276. In certain embodiments, the drive 278 may include an electric motor, a combustion engine, a hydraulic drive, a pneumatic drive, or any suitable driving mechanism. The drive 278 may be coupled to the track structure 224 or one or more of the carriages 208 depending on the particular embodiment. For example, in an embodiment having a moving track structure 224, the drive 278 may be coupled to the track structure 224 to cause motion along the closed-loop path 206. In an embodiment with a stationary track structure 224, the drive 278 may be coupled to one or more of the carriages 208 to cause movement of the carriages 208 along the closed-loop path 206. The one or more sensors 280 may include a carriage counter, a weight sensor, a speed sensor, or any other suitable sensing mechanism to facilitate control of the segmented solid feed pump 10. The controller 276 may be configured to control the torque and/or speed of the drive 278 based on input from the one or more sensors 280. For example, the controller 276 may increase or decrease the speed of the drives 278 depending on the number of passing carriages 208 per time, the volume or weight of the substance in each carriage 208, or other inputs. The controller 276 also may receive input from external sources, such as the feedstock preparation unit 104, the gasifier 106, or other components of the IGCC system 100 as shown in FIG. 1. In some embodiments, the speed or volumetric control incorporates an adjustment that takes into account the volumetric filling efficiency of receptacles 210, such as the effects of carriage speed and the physical properties of the substance being metered by solid feed pump 10. In further embodiments, the physical properties that may affect the volumetric filling efficiency of the receptacles 210 are measured on-line and the measured values of the properties are used for control. The controller 276 also may control the position of the cover 256, thereby varying the volume of a substance being delivered between the cover 256 and the passing carriages 208.

Figure 3:
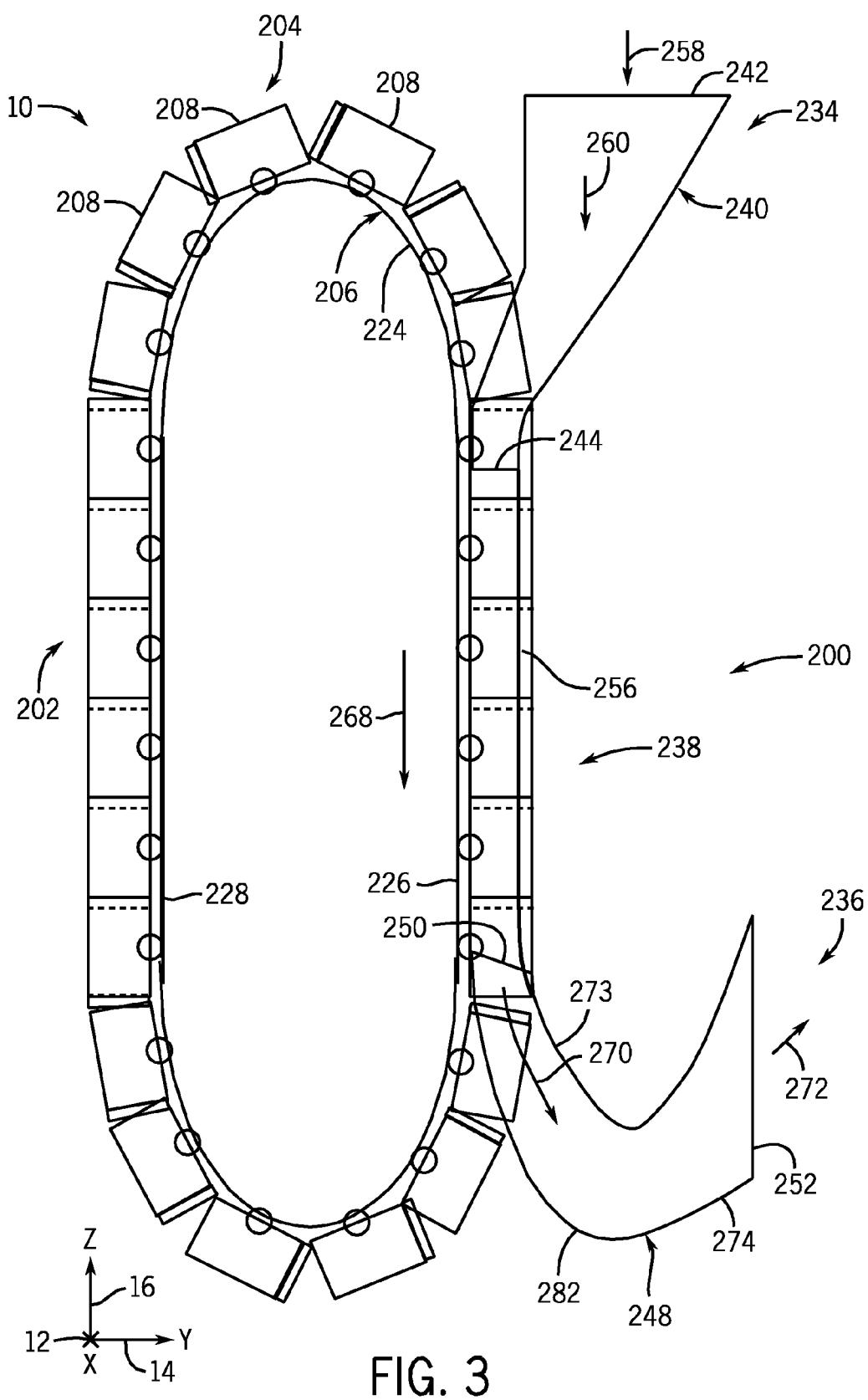
FIG. 3 is a schematic side view of an embodiment of a segmented solid feed pump oriented in another vertical arrangement.

FIG. 3 is a schematic side view of an embodiment of the segmented solid feed pump 10 of FIG. 2, illustrating an alternative configuration oriented in a different vertical arrangement relative to the vertical axis 16. In the illustrated embodiment, the segmented solid feed pump 10 has the closed-loop path 206 oriented in a vertical plane relative to the vertical axis 16, wherein the closed-loop path 206 is rotated approximately 90 degrees relative to the embodiment of FIG. 2. In particular, the illustrated closed-loop path 206 has the opposite straight path portions 226 and 228 oriented parallel to the vertical axis 16, while the opposite curved path portion 230 and 232 are disposed vertically one over the other. In this alternative vertical arrangement, the material transport section 200 is also rotated by approximately 90 degrees along with the straight path portion 226.

In this embodiment, the inlet duct 240 receives a substance into the inlet 242 in a generally vertical inlet direction 258, and then delivers the substance also in a generally vertical direction 260 into the passing carriages 208. In turn, the substance carried by the holding receptacle 210 of each carriage 208 passes in the vertical carriage direction 268 from the inlet duct 240 toward the outlet duct 248. The cover 256 along the lock-up zone 238 is oriented along the vertical axis 16, thereby guiding and holding the substance carried by each carriage 208 from spilling out before reaching the outlet duct 248. Upon reaching the outlet duct 248, the substance enters the inlet 250 of the outlet duct 248 in a generally vertical inlet direction 270. As discussed above, the inlet direction 270 may be at least initially parallel to the carriage direction 268, which is parallel to the vertical axis 16 in the illustrated embodiment. However, the inlet direction 270 may be slightly angled or gradually angled away from the carriage direction 268 and the vertical axis 16 from the inlet 250 through the upstream duct portion 273.

In the illustrated embodiment, the outlet duct 248 has an intermediate duct portion 282 between the upstream duct portion 273 and the downstream duct portion 274. In this intermediate duct portion 282, the outlet duct 248 may turn by approximately 90 degrees or more relative to the carriage direction 268 and the vertical axis 16. As a result, the downstream duct portion 274 may be oriented along the horizontal axis 14. However, in the illustrated embodiment, the downstream duct portion 274 delivers the substance through the outlet 252 in an upwardly angled outlet direction 272. For example, the outlet direction 272 may be angled by approximately 0, 10, 20, or 30, 40, or 50 degrees relative to the horizontal axis 14. Accordingly, the turn in the intermediate duct portion 282 may facilitate pressurization of the substance to facilitate the feeding or metering of the substance to a higher pressure system downstream of outlet duct 248. For example, the angle of the turn, the expansion in the turn, and the general geometry of the outlet duct 248 may work in concert with the substance to pressurize the substance, while maintaining the associated power to transport the substance through outlet duct 248 at a desired level.

In some embodiments, the outlet duct 248 may deliver the substance in a vertically downward direction or an angled downward direction relative to the vertical axis 16. In such an embodiment, the inlet duct 240 and the outlet duct 248 are generally oriented in the same direction, i.e., downward. In contrast to an embodiment having an upward turn in the intermediate duct portion 282, an embodiment directing the outlet duct 248 in a downward direction may provide for metering without a pressure increase in the substance passing through the outlet duct 248. In other words, a downwardly directed outlet duct 248 may provide either a pressure letdown or no pressure change, while still enabling metering of the substance in the segmented solid feed pump 10.

In other embodiments, the flow direction may be reversed in the segmented solid feed pump 10 shown in FIG. 3. For example, the illustrated duct 248 may function as an inlet duct, while the illustrated duct 240 may function as an outlet duct. Again, the orientation and geometry of these ducts 240 and 248 may vary from one implementation to another. For example, the ducts 240 and 248 may be angled upward, downward, or generally horizontal. Furthermore, the ducts 240 and 248 may have generally parallel orientations, perpendicular orientations, or any suitable angle relative to one another. In one embodiment, the duct 248 may be angled in an upward direction to receive a substance, while the duct 240 may be angled upward, horizontal, or downward. Again, a variety of configurations and geometries are within the scope of the disclosed embodiments.

Figure 4:
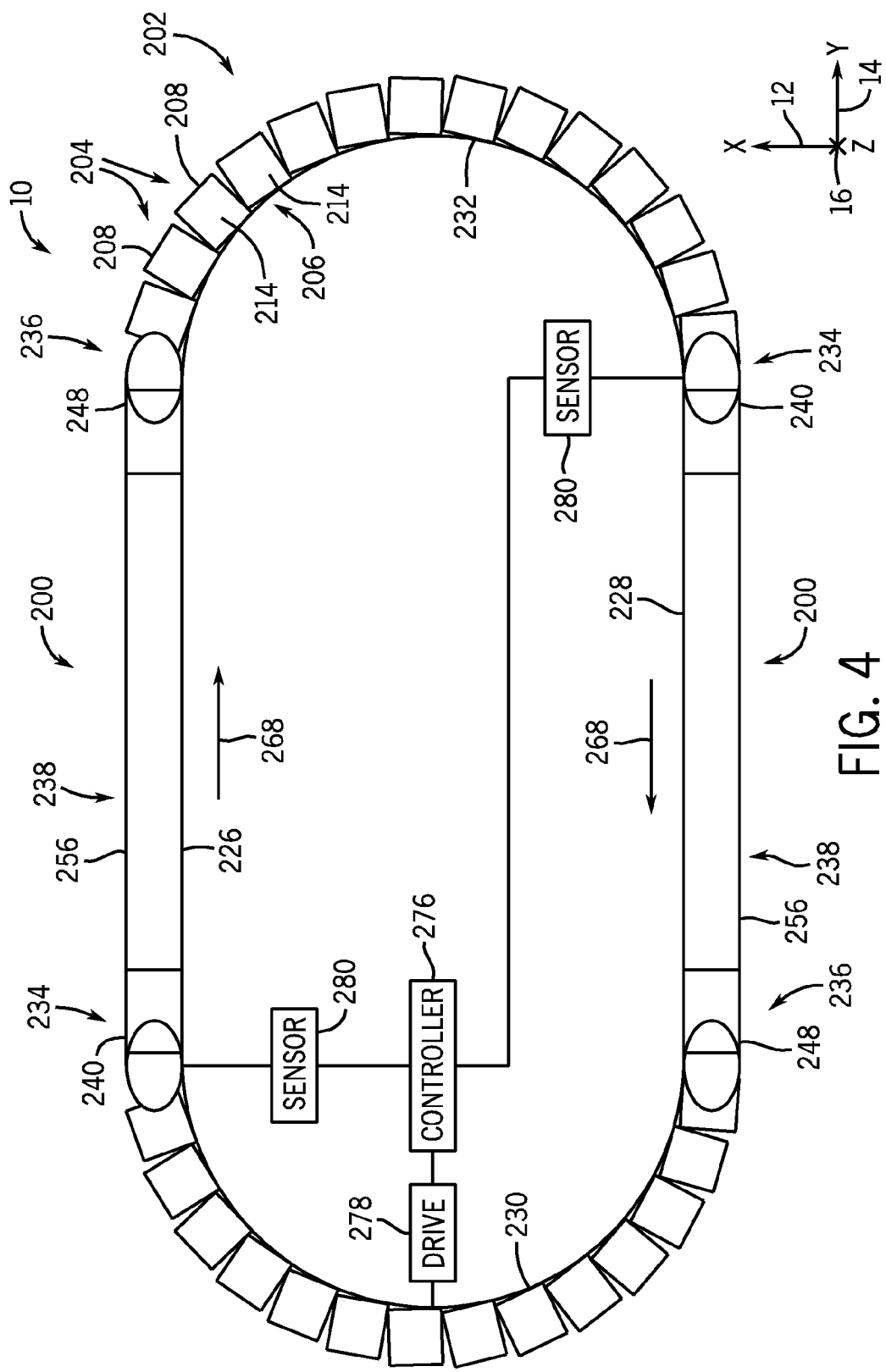
FIG. 4 is a schematic top view of an embodiment of a segmented solid feed pump oriented in a horizontal arrangement.

FIG. 4 is a schematic top view of an embodiment of the segmented solid feed pump 10 oriented in a horizontal plane. However, in certain embodiments, the pump 10 of FIG. 4 may be oriented in a vertical plane or an angled plane between horizontal and vertical planes. As illustrated, the carriage loop 202 and the closed-loop path 206 are parallel to the horizontal axes 12 and 14, such that the open top 214 of each carriage 208 is facing vertically upward out of the page in the vertical direction 16. Thus, in contrast to the embodiments of FIGS. 2 and 3, the orientation of the open top 214 does not change along the carriage loop 202, but rather it is constantly facing upward along the entire carriage loop 202. The carriage loop 202 may be coupled to (or guide) each carriage 202 along the bottom wall 212 or one of the opposite sides walls 216. Accordingly, the front and rear couplings 218 and 222 of each carriage 208 may be modified to maintain a suitable overlap between adjacent carriages 208 through transport section 200, while also enabling flexible movement of the carriages 208 along the opposite curved path portions 230 and 232 of the close loop path 206.

Furthermore, a pair of the material transport sections 200 is vertically stacked over the carriage loop 202 separately along the straight path portion 226 and the straight path portion 228. In some embodiments, the pump 10 may include any number of material transport sections 200 (e.g., 1 to 10) disposed along the carriage loop 202. For example, the pump 10 may include 2, 3, 4, or more material transport sections 200. As a result, the illustrated embodiment of the pump 10 includes two separate material transport sections 200 disposed opposite from one another along the single closed-loop path 206. For example, each material transport section 200 may be disposed along one of the respective straight path portions 226 or 228. Thus, the pump 10 of FIG. 4 has a greater capacity than the pumps 10 of FIGS. 2 and 3, because the pump 10 of FIG. 4 has two separate inlet ducts 240 and two separate outlet ducts 248. In other words, the two material transport sections 200 substantially increase the capacity of the pump 10 for a given carriage loop 202.

In certain embodiments, the two material transport sections 200 may be operated alone or in combination with one another. For example, the controller 276 may receive feedback from sensors 280 disposed at each inlet or metering zone 234, feedback from external sensors indicating a demand for a substance, or feedback from external sensors indicating a supply of a substance. For example, the controller 276 may receive metering feedback from the sensors 280 or external control signals from the feedstock preparation unit 104, the gasifier 106, or other portions of the IGCC system 100. Depending on the desired flow of the substance through the segmented solid feed pump 10, the controller 276 may adjust the speed via the drive 278, or selectively engage or disengage one or both of the metering zones 234. For example, the controller 276 may block flow of the substance into one of the metering zones 234, thereby disabling that particular material transport section 200. In this manner, the segmented solid feed pump 10 has a greater control on throughput of the substance to the gasifier 106 (or another downstream system).

Figure 5:
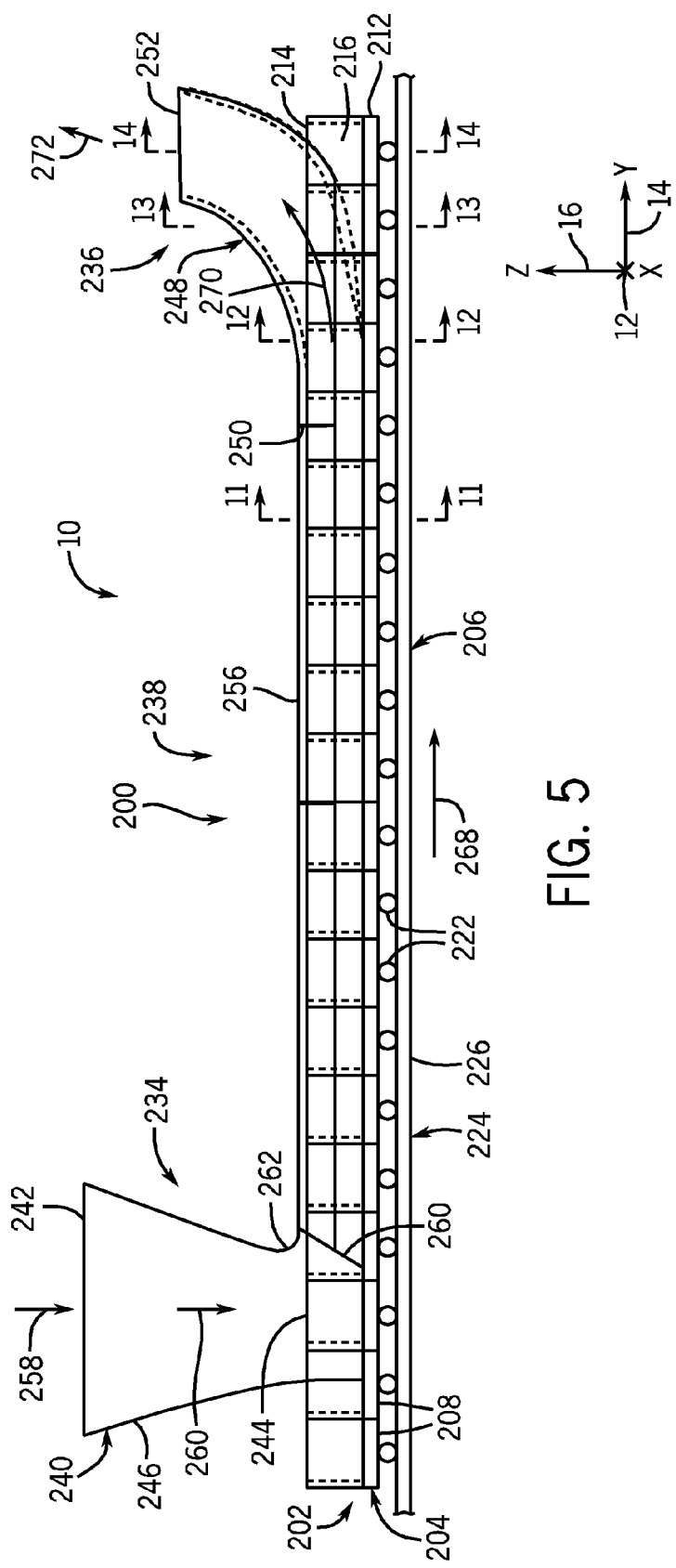
FIG. 5 is a schematic side view of an embodiment of the segmented solid feed pump as illustrated in FIG. 4.

FIG. 5 is a schematic side view of an embodiment of the segmented solid feed pump 10 as illustrated in FIG. 4. As discussed above, the illustrated pump 10 may have a horizontal arrangement, a vertical arrangement, or an arrangement between horizontal and vertical arrangements in various embodiments. However, as illustrated, the track structure 224 is oriented parallel to the horizontal plane through the horizontal axes 12 and 14, such that the carriage loop 202 and the material transport section 200 are disposed vertically above the track structure 224. For example, the pump segments 204 may move along the closed-loop path 206 in a manner curving into the page on the far left and curving out of the page on the far right. In the illustrated embodiment, each carriage 208 has one or more track followers or wheels 222 disposed between the bottom wall 212 and the track structure 224. In addition, the open top 214 of each carriage 208 is substantially or entirely covered by the contoured guide plate or cover 256 between the inlet duct 240 and the outlet duct 248.

In the illustrated embodiment, inlet duct 240 has a configuration similar to the embodiment of FIG. 2, while the outlet duct 248 has a configuration different than the embodiment of FIG. 2. For example, the outlet duct 248 intersects with the moving carriages 208 in a substantially parallel orientation along the horizontal axis 14 and rises vertically gradually and with relatively constant cross-sectional area. The gradual interface angle between the duct 248 and the moving carriages 208 may substantially improve the performance of the segmented solid feed pump 10. For example, the gradual interface angle may reduce the possibility of jamming or clogging of the substance being transported by the pump 10, while also reducing the power of the drive 278 sufficient to move the carriages 208 and substance along the material transport section 200. In other words, the gradual interface angle may reduce the resistance to movement of the pump segments 204 along the closed-loop path 206. As illustrated in FIG. 5, the outlet duct 248 may turn approximately 60 to 120 degrees, 70 to 110 degrees, 80 to 100 degrees, or about 90 degrees. However, the inlet and outlet ducts 240 and 248 may have any angle, orientation, and shape in various embodiments of the pump 10.

Figure 6:
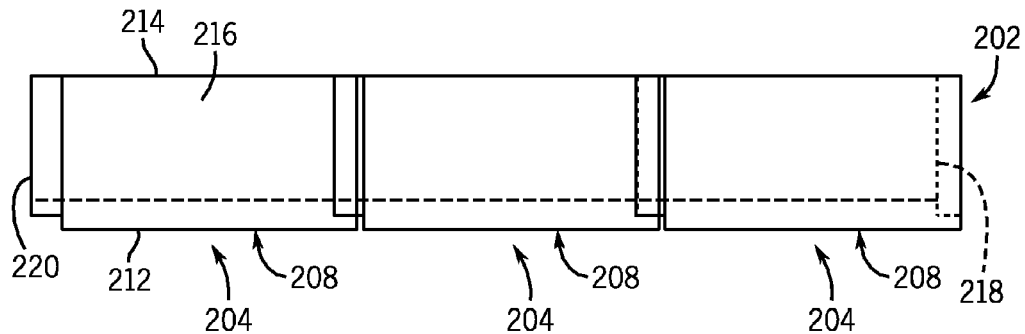
FIG. 6 is a schematic side view of three adjacent pump segments of a segmented solid feed pump in accordance with certain embodiments.

FIGS. 6, 7, 8, 9, and 10 are different views of an embodiment of a pump segment 204 that may be used in the segmented solid feed pump 10 as illustrated in FIGS. 1-5. FIG. 6 is a side view of three pump segments 204 of the carriage loop 202, illustrating an overlapping interconnection of adjacent carriages 208 via the front coupling 218 and the rear coupling 220. As illustrated, each carriage 208 has the front coupling 218 mated with an adjacent rear coupling 220, while each carriage 208 also has the rear coupling 220 mated with an adjacent front coupling 218. The overlapping interconnection of these front and rear couplings 218 and 220 substantially captures a substance across the adjacent carriages 208. For example, the overlap between the front and rear couplings 218 and 220 may provide overlap along the bottom wall 212 and the opposite side walls 216 from one carriage to another. Furthermore, in certain embodiments, each pump segment 204 may incorporate at least one seal along at least one mating surface to reduce leakage of the substance and other process fluids, such as but not limited to high pressure gas.

Figure 7:
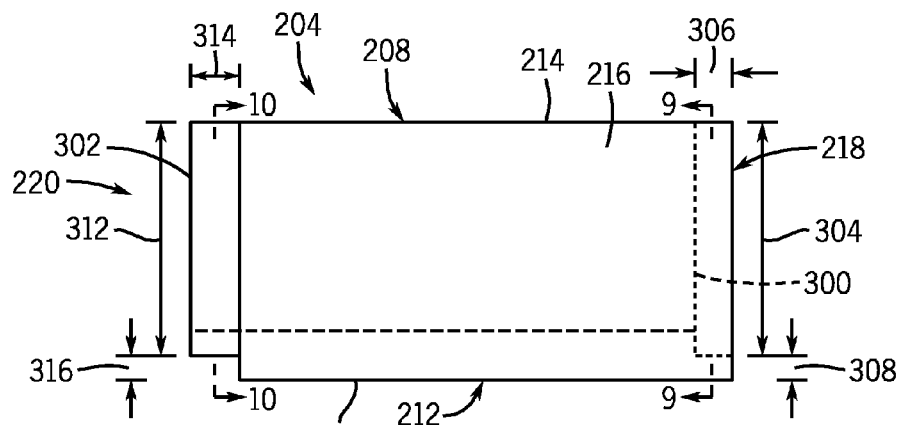
FIG. 7 is a schematic side view of an embodiment of a pump segment of a segmented solid feed pump as illustrated in FIGS. 1-6.

FIG. 7 is a side view of an embodiment of the pump segment 204 as illustrated in FIGS. 1-6. As illustrated, the pump segment 204 has the front and rear couplings 218 and 220 disposed on opposite ends of the carriage 208. In the illustrated embodiment, the front coupling 218 has a female portion 300 recessed into the bottom wall 212 and the opposite side walls 216. The rear coupling 220 has a male portion 302 extending outwardly from the bottom wall 212 and the opposite side walls 216. In certain embodiments, each carriage 208 may have a reversed configuration with the female portion 300 disposed at the rear coupling 220 and the male portion 302 disposed at the front coupling 218. In either arrangement, the female portion 300 and the male portion 302 have substantially similar or identical dimensions configured to fit with one another between adjacent carriages 208. For example, the female portion 300 may have a vertical depth 304, a horizontal depth 306, and a vertical offset 308 relative to a bottom surface 310 of the bottom wall 212. Likewise, the male portion 302 may have a vertical depth 312, a horizontal depth 314, and a vertical offset 316 relative to the bottom surface 310. These dimensions and shapes of the portions 300 and 302 may be configured to facilitate the movement between and alignment of adjacent carriages 208, while providing substantial overlap between adjacent front and rear couplings 218 and 220.

Figure 8:
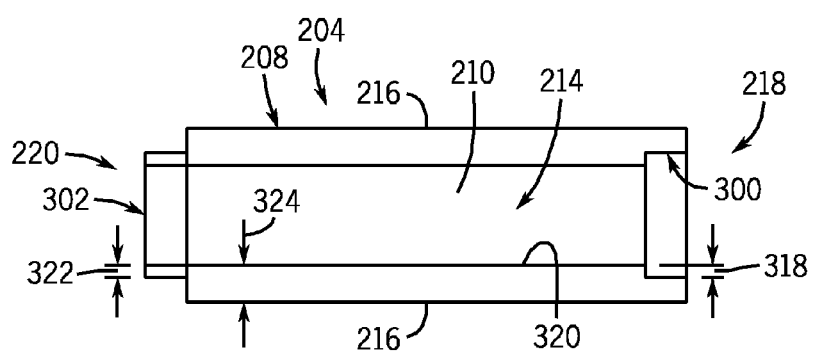
FIG. 8 is a schematic top view of an embodiment of the pump segment as illustrated in FIG. 7.

FIG. 8 is a top view of an embodiment of the pump segment 204 as illustrated in FIGS. 1-7. As illustrated, the female portion 300 is recessed into the opposite side walls 216, while the male portion 302 protrudes outwardly from the opposite side walls 216. In particular, the illustrated female portion 300 is recessed into both of the opposite side walls 216 by a lateral offset 318 relative to an interior side surface 320 of the sidewalls 216. In contrast, the male portion 302 protrudes from both of the opposite sidewalls 216 with a lateral thickness 322 flush with the interior side surfaces 320. In the illustrated embodiment, the dimensions 318 and 322 of the female and male portions 300 and 302 are substantially equivalent, and are substantially less than a thickness 324 of the opposite side walls 216. The engagement of male and female portions 300 and 302 between adjacent carriages 208 provides a substantial overlap along both sidewalls 216 and the bottom wall 212.

FIG. 9 is a cross-sectional end view of the pump segment 204 taken along line 9-9 of FIG. 7. In particular, FIG. 9 illustrates a cross-section of the female portion 300 of the front coupling 218 of the carriage 208. In the illustrated embodiment, the female portion 300 has a U-shaped recess 328 (e.g., defining an axial end opening) extending into the bottom wall 212 and the opposite side walls 216. However, the recess 328 may have a variety of shapes and configurations in other embodiments of the pump segment 204.

FIG. 10 is a cross-sectional end view of the pump segment 204 taken along line 10-10 of FIG. 7. In particular, FIG. 10 illustrates a cross-section of the male portion 302 of the rear coupling 220 of the carriage 208. As illustrated, the male portion 302 has a U-shaped protrusion 326 (e.g., defining an axial end opening) extending outwardly from the bottom wall 212 and the opposite side walls 216. As appreciated, the U-shaped protrusion 326 is configured to mate with the U-shaped recess 328 of an adjacent carriage 208, thereby providing overlap along the bottom walls 212 and the opposite side walls 216 of the adjacent carriages 208.

Figure 11:
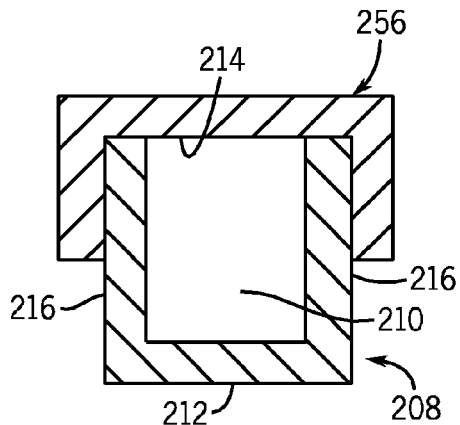
FIG. 11 is a schematic cross-sectional view of the segmented solid feed pump taken along line 11-11 of FIG. 5.

FIGS. 11, 12, 13 and 14 are cross-sections taken through line 11-11, line 12-12, line 13-13, and 14-14 of FIG. 5. These figures illustrate the transition from the lock-up zone 238 into and through the pressurization zone 236. In particular, FIG. 11 is a cross-sectional view in the lock-up zone 238, illustrating the cover 256 disposed over one of the carriages 208. As illustrated, the cover 256 extends over the open top 214 and around the opposite side walls 216 of the carriage 208. In this manner, the cover 256 and the carriage 208 completely enclose the holding receptacle 210 inside the carriage 208. In the illustrated embodiment, the cover 256 has a downwardly facing U-shape, while the carriage 208 has an upwardly facing U-shape. These opposite U-shapes overlap with one another to block any leakage of a substance residing in the holding receptacle 210. In certain embodiments, seals are incorporated in the carriages 208, the cover 256, or both, to facilitate the control of leakage.

Figure 12:
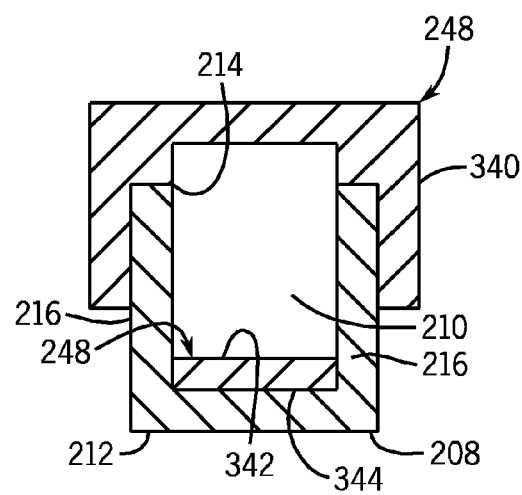
FIG. 12 is a schematic cross-sectional view of the segmented solid feed pump taken along line 12-12 of FIG. 5.

FIG. 12 is a cross-sectional view of the pressurization zone 236 of the material transport section 200, illustrating the outlet duct 248 interfacing with one of the carriages 208. In particular, the outlet duct 248 includes an upper duct portion 340 and a lower duct portion 342 to capture a substance being delivered by the holding receptacle 210 of the carriage 208. In the illustrated embodiment, the upper duct portion 340 extends over the open top 214 and around the opposite side walls 216 of the carriage 208, while the lower duct portion 342 is disposed inside the carriage 208 along the bottom wall 212. Similarly, although not illustrated in FIG. 12, the inlet duct 248 may have upper and lower duct portions, wherein the lower duct portion extends to a bottom of the carriages 208 to guide flow of a substance into the carriages 208 while blocking any backflow of the substance. As illustrated in FIG. 12, the upper duct portion 340 has a downwardly facing U-shape, while the carriage 208 has an upwardly facing U-shape. These opposite U-shapes overlap with one another to block any leakage of a substance residing in the holding receptacle 210. In addition, the lower duct portion 342 may initially interface with the bottom wall 212 in close proximity with a bottom interior surface 344. In other words, the lower duct portion 342 may have a tight clearance with the bottom interior surface 344 of the carriage 208. In this manner, the lower duct portion 342 is configured to guide the substance within the holding receptacle 210 in an upward direction away from the bottom interior surface 344, thereby channeling the substance through the outlet duct 248. In certain embodiments, the leading edge of lower duct portion 342 has an acute angle to ease the transition of the solid feedstock from the carriage 208 into outlet duct 248. For instance, the leading edge of lower duct portion 342 may be an acute angle between approximately 0 and 30 degrees, such as an angle between approximately 5 and 20 degrees. In some embodiments, one or more seals are disposed between lower duct portion 342 and carriage 208. Furthermore, some embodiments include one or more seals between carriage 208 and both upper duct portion 340 and lower duct portion 342.

Figure 13:
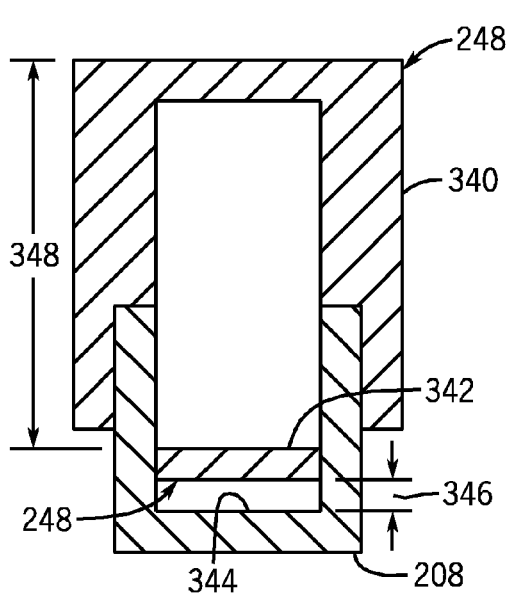
FIG. 13 is a schematic cross-sectional view of the segmented solid feed pump taken along line 13-13 of FIG. 5.

FIG. 13 is a cross-sectional view of the pressurization zone 236 taken along line 13-13 of FIG. 5, further illustrating the transition of the outlet duct 248 downstream of the position shown in FIG. 12. As illustrated, the lower duct portion 342 of the outlet duct 248 is substantially offset from the bottom interior surface 344, as indicted by vertical offset 346. Likewise, the upper duct portion 340 of the outlet duct 248 is vertically expanded relative to the lower duct portion 342, as indicted by vertical offset 348. Thus, the upper and lower duct portions 340 and 342 gradually raise the contents from the holding receptacles 210 of the passing carriages 208 upwardly away from the carriage loop 202, while simultaneously expanding the vertical height of the outlet duct 248. In some embodiments, the outlet duct 248 may maintain rather than expand the vertical offset 348 in the downstream direction. In other embodiments, the outlet duct 248 may contract the vertical offset 348 in the downstream direction.

Figure 14:
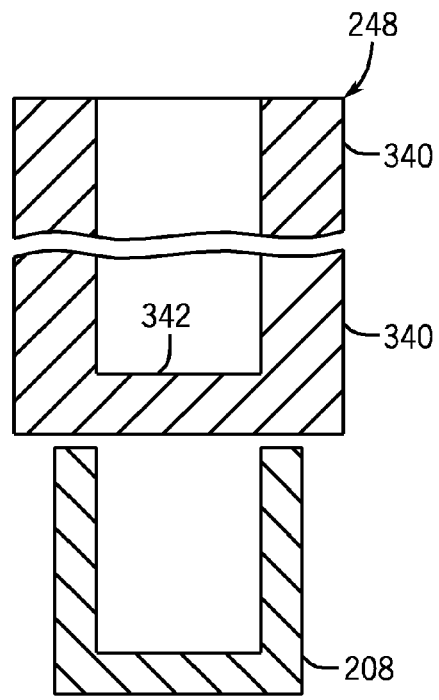
FIG. 14 is a schematic cross-section view of the segmented solid feed pump taken along line 14-14 of FIG. 5.

FIG. 14 is a cross-sectional view of outlet and pressurization zone 236 taken along line 14-14 of FIG. 5, illustrating the transition of the outlet duct 248 downstream of the position shown in FIG. 13. As illustrated, the upper duct portion 340 and lower duct portion 342 have merged into a single seamless duct. The seamless duct creates a smooth region within outlet duct 248, which facilitates flow of the substance through the duct 248 toward the downstream process.

As generally illustrated by FIGS. 5, 11, 12, 13 and 14, the illustrated pump 10 transfers a substance into and through the lock-up zone 238 and the outlet or pressurization zone 236 in a manner that meters and pressurizes the substance. In particular, FIG. 5 illustrates an upward turn in the outlet duct 248, and FIGS. 12 and 13 illustrate a raising bottom (e.g., lower duct portion 342), which facilitates the transition of the substance from the carriages 208 into outlet duct 248. The outlet duct 248 also may enable pressurization of the substance as the substance passes through the outlet duct 248. For example, carriages 208 lock up the substance (e.g., coal) along the lock-up zone 238 between the inlet and outlet ducts 240 and 248, thereby forcing the substance against and into the outlet duct 248. The outlet duct 248 then creates pressure in the substance in the sealed duct portion of outlet duct 248. In some embodiments, the outlet duct 248 may not include an upward turn with a raising bottom (e.g., lower duct portion 342), and may not pressurize the substance. Instead, the outlet duct 248 may have a straight outlet path that subsequently turns downward. However, the outlet duct 248 may have a variety of geometries and configurations in various embodiments. Furthermore, certain embodiments of the outlet duct 248 may include or exclude a valve configured to control a back pressure and/or maintain a pressure.

Figure 15:
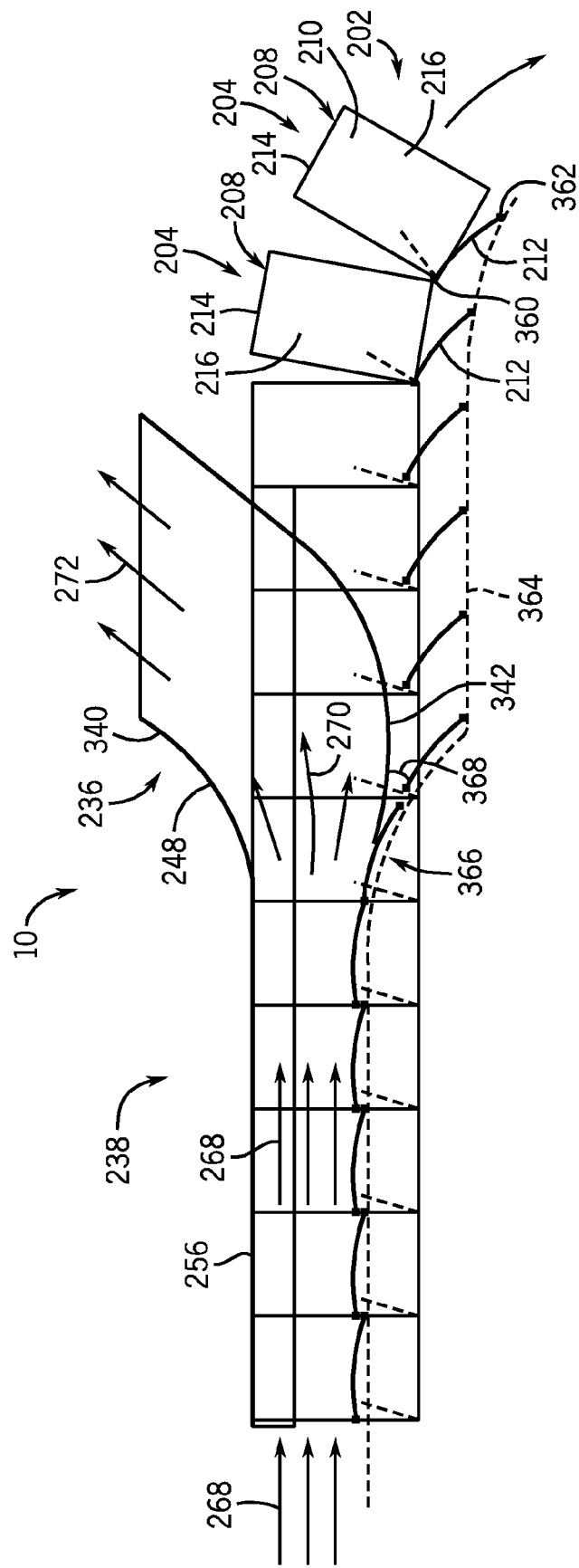
FIG. 15 is a partial schematic side view of an embodiment of a segmented solid feed pump having pump segments with movable bottom walls.

FIG. 15 is a partial schematic side view of an embodiment of the segmented solid feed pump 10 as illustrated in FIGS. 1-14, illustrating a movable bottom wall 212 of the carriage 208. In certain embodiments, the movable bottom wall 212 may provide a more smooth transition of the substance from the carriages 208 into the outlet duct 248. As illustrated, each carriage 208 includes a movable bottom wall 212 having a carriage joint 360 coupled to the carriage 208 and a track joint 362 disposed along a guide track 364. For example, the joints 360 and 362 may include one or more pins configured to enable rotation of the movable bottom wall 212 depending on the position along the closed-loop path 206. The guide track 364 may include a pair of opposite channels positioned about opposite sides of the carriages 208, such that opposite track joints 362 protrude from the carriages 208 into the guide track 364. Likewise, the carriage joint 360 may include one or more pins disposed in channels located in the opposite side walls 216 of each respective carriage 208.

As the carriages 208 move in the carriage direction 268 along the closed-loop path 206, the guide track 364 changes positions, thereby guiding the track joint 362 toward or away from the respective carriage 208. In this manner, the interface between the track joint 362 and the guide track 364 causes rotation of the movable bottom wall 216 to improve the interface with the material transport section 200. For example, as illustrated, the movable bottom walls 212 may remain generally horizontal along the metering zone 234 and the lock-up zone 238 below the inlet duct 240 and the cover 256. Upon reaching the outlet duct 248 of the pressurization zone 236, the guide track 364 may cause the movable bottom wall 212 to gradually pivot or rotate in a downward direction to create a tapered interface 366 between the movable bottom walls 212 and the lower duct portion 342 of the outlet duct 248. For example, the carriage joint 360 may facilitate a downward and slight backward movement of bottom walls 212. As a result of this movement, the bottom wall 212 of each carriage 208 is able to skim across the bottom leading edge of the lower duct portion 342 without opening gaps between adjacent bottom walls 212, e.g., due to the rotation until after the mating joint 360 between two adjacent carriages 208 moves at least an offset distance past the leading edge of lower duct portion 342. For example, the offset distance may include, but is not limited to, 1 to 5 centimeters past the leading edge of lower duct portion 342. The rotation of the bottom walls 212 also may vary across different implementations of the pump 10. For example, an angle 368 between the movable bottom wall 212 and the lower duct portion 342 may range between approximately 0 to 20 degrees. In certain embodiments, the angle 368 may be less than approximately 5, 10, 15, 20, 25, or 30 degrees. The tapered interface 366 may substantially improve the transition from the carriages 208 into the outlet duct 248.

Figure 16:
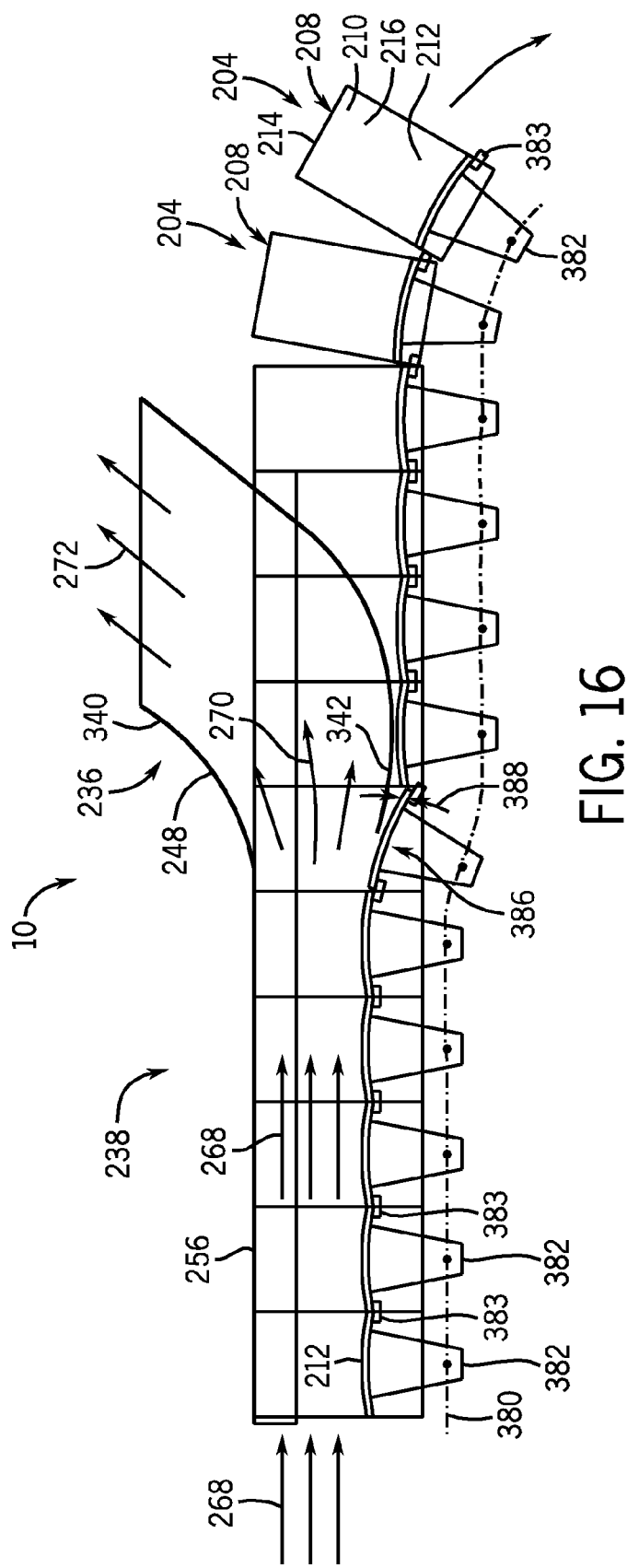
FIG. 16 is a partial schematic side view of another embodiment of a segmented solid feed pump having pump segments with movable bottom walls.

FIG. 16 is a partial schematic side view of an embodiment of the segmented solid feed pump 10 as illustrated in FIGS. 1-15, illustrating carriages 208 with movable bottom walls 212. In the illustrated embodiment, each bottom wall 212 is coupled to a guide track 380 via a pivot arm 382. For example, the curvature of the guide track 380 may control the rotational orientation of the pivot arm 382 and the removable bottom wall 212 along the closed-loop path 206. In certain embodiments, the guide track 380 may include a belt, a chain, or a guide channel mating with pins on each pivot arm 382. Similar to the embodiment of FIG. 15, the guide track 380 and pivot arms 382 are configured to position the movable bottom wall 212 in a generally horizontal position along the metering zone 234 and the lock-up zone 238, while gradually pivoting the movable bottom wall 212 in the vicinity of the pressurization zone 236. In other words, upon approaching the outlet duct 248, the guide track 380 may change directions or positions relative to the carriage 208, thereby causing the pivot arms 382 to rotate the bottom walls 212 to create a tapered interface 386 between the bottom walls 212 and the lower duct portion 342 of the outlet duct 248. Again, an angle 388 between the bottom wall 212 and the lower duct portion 342 may range approximately 0 to 20 degrees. For example, the angle 388 may be less than approximately 5, 10, 15, 20, 25, or 30 degrees. Furthermore, the leading edge of each bottom wall 212 may include a short extension 383 that extends under the preceding bottom wall 212 to minimize leakage at the interface between adjacent carriages 208. For example, the extensions 383 may block leakage between adjacent bottom walls 212 as the carriages 208 rotate in the vicinity of the lower duct portion 342, e.g., during the approach and passing of the bottom walls 212 relative to the leading edge of the lower duct portion 342.

Figure 17:
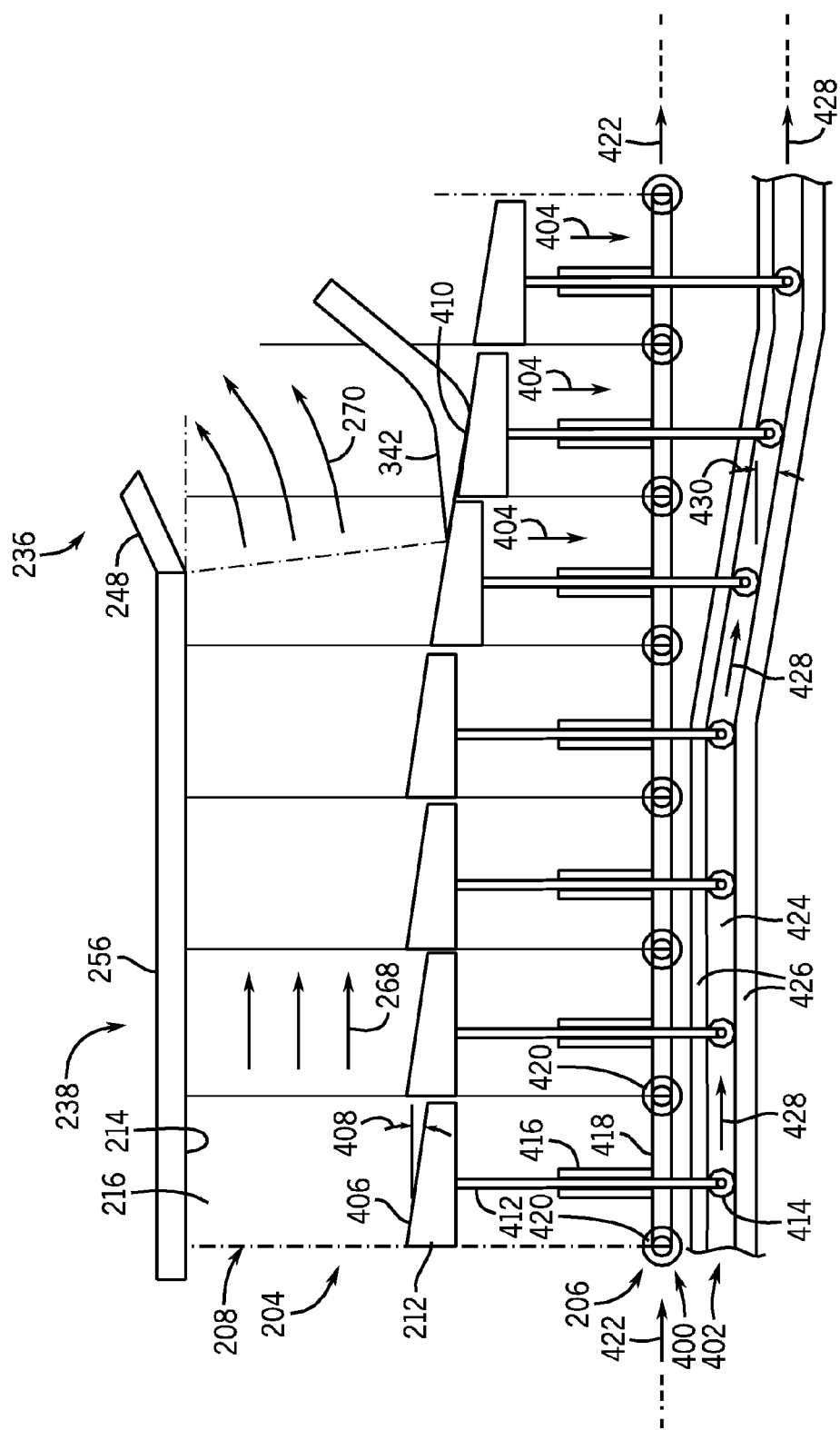
FIG. 17 is a partial schematic side view of another embodiment of a segmented solid feed pump having pump segments with movable bottom walls.

FIG. 17 is a partial schematic side view of an embodiment of the segmented solid feed pump 10 as illustrated in FIGS. 1-16, illustrating carriages 208 with movable bottom walls 212. In the illustrated embodiment, each carriage 208 is coupled to a first guide track 400 and a second guide track 402, which are independent and different from one another. More specifically, the guide track 400 couples to the opposite side walls 216 of each carriage 208, while the guide track 402 independently couples to the bottom wall 212 of each carriage 208. As a result, the opposite side walls 216 follow a different route than the bottom walls 212 according to the differences between the first and second guide tracks 400 and 402.

In the illustrated embodiment, the guide rack 402 supporting the bottom walls 212 diverges from the guide track 400 supporting the opposite side walls 216 as the carriages 208 approach the outlet duct 248, as indicated by arrows 268. In this manner, the guide track 402 gradually moves the bottom walls 212 in a downward direction 404 to facilitate a smooth interface between the bottom walls 212 and the lower duct portion 342 of the outlet duct 248. As illustrated, each bottom wall 212 has a rectangular shape with a tapered top surface 406. The tapered top surface 406 has a negative angle 408 relative to the direction 268 toward the outlet duct 248. For example, the angle 408 may be approximately 5 to 45 degrees. As each bottom wall 212 approaches the lower duct portion 342, the tapered top surface 406 slides along a tapered bottom surface 410 of the lower duct portion 342. For example, the tapered bottom surface 410 may be angled similar to the angle 408 of the tapered top surface 406 to provide a smooth transition with a minimal clearance. The matched angles of tapered surfaces 406 and 410 may reduce the possibility of leakage of the pumped substance, thereby reducing waste.

As illustrated, each bottom wall 212 includes a shaft 412 and a guide wheel 414. The shaft 412 extends through a shaft guide 416 coupled to a linkage 418, which is coupled to adjacent linkages 418 via pivot joints 420. The linkages 418 and pivot joints 420 are coupled to the opposite side walls 216 of each carriage 208, and follow the guide track 400 as indicated by arrows 422. For example, each carriage 208 may form a U-shaped structure defined by the opposite side walls 216 and the linkage 418. The guide wheel 412 is captured in a slot 424 between opposite rails 426, such that the guide wheel 412 slides along the guide track 402 as indicated by arrows 428. In certain embodiments, the shaft guide 416 may include a hollow tube configured to enable upward and downward movement of the shaft 412, thereby allowing upward and downward movement of the bottom wall 212 according to the position of the wheel 414 along the guide track 402. As noted above, the guide track 402 diverges from the guide track 400 in the region approaching the outlet duct 248. As illustrated, the guide track 402 has an angle 430 away from the guide track 400. In certain embodiments, the angle 430 may be substantially the same as the angle 408 of the tapered top surface 406 of each bottom wall 212 and the tapered bottom surface 410 of the lower duct portion 342. In this manner, the substantially matched angles may improve the transition of the bottom walls 212 to the lower duct portion 342, while substantially preventing any leakage between adjacent bottom walls 212 and the lower duct portion 342.

Figure 18:
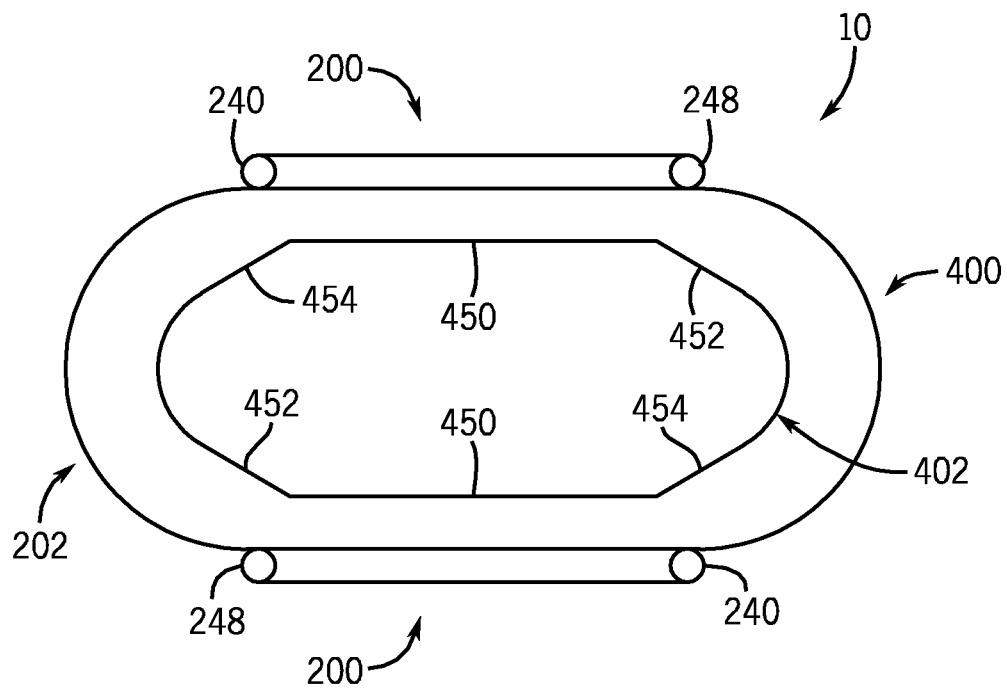
FIG. 18 is a schematic side view of an embodiment of independent guide tracks of the segmented solid feed pump of FIG. 17.

FIG. 18 is a schematic side view of an embodiment of the segmented solid feed pump 10, illustrating the independent guide tracks 400 and 402 of FIG. 16. In the illustrated embodiment, the segmented solid feed pump 10 includes a pair of opposite material transport section 200 disposed along the carriage loop 202, wherein the carriage loop 202 is defined by the independent guide tracks 400 and 402. In particular, as discussed above with reference to FIG. 17, the guide track 400 is configured to guide movement of the opposite side walls 216 and the linkage 418 of each carriage 208, while the guide track 402 is configured to guide movement of the bottom wall 212 of each carriage 208.

The illustrated guide track 402 diverges from the guide track 400 in four locations corresponding to the inlet duct 240 and the outlet duct 248 of each material transport section 200. Accordingly, the guide track 402 includes a parallel path 450 along each material transport section 200 between the inlet and outlet ducts 240 and 248, while the guide track 402 includes non-parallel paths (e.g., diverging paths 452 and converging paths 454) in the transition region of the inlet and outlet ducts 240 and 248. For example, as each carriage 208 approaches the outlet duct 248, the diverging path 452 may decrease the height of the bottom wall 212. As each carriage 208 approaches the inlet duct 240, the converging path 454 may increase the height of the bottom wall 212. These variations in height in the bottom wall 212, along with the tapered top surfaces 406, substantially improve the transition of the carriages 208 relative to the inlet and outlet ducts 240 and 248, while also reducing the possibility of leakage. As appreciated, the first and second guide paths 400 and 402 may have a variety of alternative configurations in other embodiments.

Figure 19:
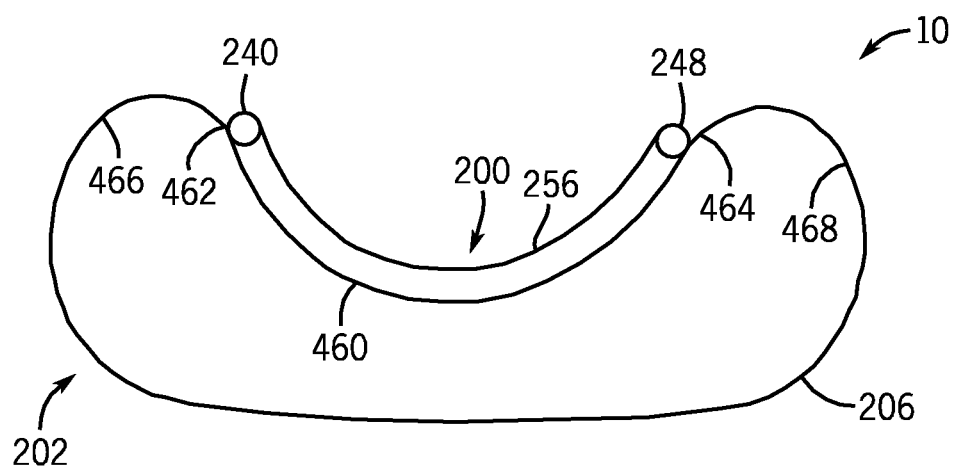
FIG. 19 is a schematic side view of an embodiment of a segmented solid feed pump having a material transport section along an inwardly curved portion of a closed-loop path.

FIG. 19 is a schematic side view of an embodiment of the segmented solid feed pump 10, illustrating the material transport section 200 disposed along an inwardly curved portion 460 of the closed-loop path 206. In the illustrated embodiment, the inlet duct 240 and the outlet duct 248 are disposed at transitions 462 and 464 between the inwardly curved portion 460 and outwardly curved portions 466 and 468 of the closed-loop path 206. Furthermore, the inlet and outlet ducts 240 and 248 may be oriented perpendicular to the plane of the closed-loop path 206. In addition, the illustrated embodiment orients the open top 214 of each carriage 208 outwardly toward the cover 256, which has an inwardly curved shape corresponding to the inwardly curved portion 460 of the closed-loop path 206. Again, the closed-loop path 206 may have any suitable geometry or configuration in various embodiments of the pump 10.

In certain embodiments, the pump 10 may be configured with cleaning equipment to facilitate removal and collection of accumulated substance from the surfaces of the segments, internal components, and other portions of pump 10 during operation of pump 10 or while the pump 10 is offline (i.e., shutdown). For example, the cleaning equipment may include, but it not limited to, brushes, automatic blowers, and dust collectors. In some embodiments, the pump 10 may continuously and/or automatically perform cleaning operations (e.g., removal and collection) based on at least one sensor or at least one timer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a segmented solid feed pump, comprising:
      a closed-loop path; and
      a plurality of pump segments coupled together in series along an axis of the closed-loop path, wherein each pump segment comprises a carriage having a holding receptacle defined by a bottom wall, a top, opposite side walls extending between the bottom wall and the top, and at least one axial end opening extending from the top to the bottom wall along the opposite side walls, and the plurality of pump segments move along the closed-loop path.

2. The system of claim 1, wherein each pump segment comprises the carriage having the holding receptacle with first and second axial end openings extending from an opening in the top to the bottom wall along the opposite side walls, wherein the first and second axial end openings are disposed on axially opposite end portions of the pump segment.

3. The system of claim 2, wherein adjacent pump segments comprise an overlapping connection along the opposite side walls and the bottom wall at both the first and second axial end openings.

4. The system of claim 3, wherein each overlapping connection comprises a U-shaped interface defined by the opposite side walls and the bottom wall.

5. The system of claim 1, wherein the bottom wall of each pump segment comprises a movable portion configured to move relative to the opposite side walls.

6. The system of claim 5, wherein the movable portion comprises a rotatable portion configured to rotate relative to the opposite side walls.

7. The system of claim 1, comprising a guide track coupled to the bottom wall of each pump segment.

8. The system of claim 1, wherein the segmented solid feed pump comprises a first transport section disposed along a first portion of the closed-loop path, wherein the first transport section comprises a first inlet duct, a first outlet duct, and a first guide extending between the first inlet duct and the first outlet duct.

9. The system of claim 8, wherein the segmented solid feed pump comprises a second transport section disposed along a second portion of the closed-loop path, wherein the second transport section comprises a second inlet duct, a second outlet duct, and a second guide extending between the second inlet duct and the second outlet duct, wherein the first and second portions are opposite straight portions of the closed-loop path.

10. The system of claim 8, wherein the first outlet duct comprises a lower duct portion extending into the holding receptacle of each passing pump segment at an angle relative to the closed-loop path, and the angle is at least less than approximately 45 degrees.

11. The system of claim 8, wherein the first outlet duct comprises an upper duct portion and a lower duct portion, the upper duct portion covers the holding receptacle of each pump segment moving by the first outlet duct, and the lower duct portion extends into the holding receptacle toward a bottom wall of each pump segment moving by the first outlet duct.

12. A system, comprising:
   a segmented solid feed pump, comprising:
      a closed-loop path;
      a plurality of pump segments coupled together in series along the closed-loop path, wherein the plurality of pump segments move along the closed-loop path;
      a first material transport section disposed in a first fixed position along a first portion of the closed-loop path, wherein the first material transport section comprises a first inlet duct, a first outlet duct, and a first guide extending between the first inlet duct and the first outlet duct; and
      a second transport section disposed in a second fixed position along a second portion of the closed-loop path, wherein the second transport section comprises a second inlet duct, a second outlet duct, and a second guide extending between the second inlet duct and the second outlet duct.

13. The system of claim 12, wherein each pump segment comprises a carriage having a bottom wall, opposite side walls, and an open top defining a holding receptacle, wherein adjacent pump segments comprise an overlapping connection along the opposite side walls and the bottom wall.

14. The system of claim 12, wherein each pump segment comprises a movable wall portion configured to move relative to the pump segment.

15. The system of claim 14, wherein the movable wall portion comprises a rotatable wall portion configured to rotate relative to the pump segment.

16. A system, comprising:
   a segmented solid feed pump, comprising:
      a closed-loop path;
      a plurality of pump segments coupled together in series along the closed-loop path, wherein the plurality of pump segments move along the closed-loop path, wherein each pump segment comprises opposite side walls, an open top, and a movable bottom wall; and
      a guide track independent from the closed-loop path, wherein the movable bottom wall of each pump segment has a segment orientation or a segment position relative to each pump segment that varies based on a position along the guide track.

17. The system of claim 16, comprising a material transport section disposed in a fixed position along a portion of the closed-loop path, wherein the material transport section comprises an inlet duct, an outlet duct, and a guide extending between the inlet duct and the outlet duct.

18. The system of claim 17, wherein the movable bottom wall of each pump segment has a first orientation generally parallel to the closed-loop path and a second orientation generally tilted relative to the closed-loop path, the movable bottom wall of each pump segment has the first orientation while moving along the inlet duct and the guide, and the movable bottom wall of each pump segment has the second orientation while moving along the outlet duct.

19. The system of claim 1, wherein the receptacles of adjacent pump segments of the plurality of pump segments are open to one another to define a common receptacle.

20. The system of claim 1, wherein the bottom walls of adjacent pump segments of the plurality of pump segments overlap with one another to define a common bottom wall.

21. The system of claim 1, comprising a first duct portion configured to pass through the holding receptacles of the plurality of pump segments while the plurality of pump segments move along the closed-loop path, and the first duct portion is configured to extend into the holding receptacle toward the bottom wall of each pump segment while the plurality of pump segments move along the closed-loop path.

22. The system of claim 21, wherein the first duct portion is stationary while the plurality of pump segments are movable along the closed-loop path.

23. The system of claim 21, comprising a second duct portion configured to cover each pump segment while the plurality of pump segments move along the closed-loop path, wherein the first and second duct portions are coupled to one another.

24. A system, comprising:
a segmented solid feed pump, comprising:
a closed-loop path;
a plurality of pump segments coupled together in series along the closed-loop path, wherein each pump segment comprises a holding receptacle, and the plurality of pump segments are configured to move along the closed-loop path; and
a first duct portion configured to pass through the holding receptacles of the plurality of pump segments while the plurality of pump segments move along the closed-loop path.

25. The system of claim 24, comprising a second duct portion configured to cover each pump segment while the plurality of pump segments move along the closed-loop path, wherein the first and second duct portions are coupled to one another.

* * * * *